Oct. 10, 1944.                E. J. MOFFITT                2,359,931
                         AMMUNITION TRIMMING MACHINE
                            Filed Nov. 18, 1942

INVENTOR.
Edward J. Moffitt
BY Harold L. Gammons
AGENT

Patented Oct. 10, 1944

2,359,931

UNITED STATES PATENT OFFICE 2,359,931

AMMUNITION TRIMMING MACHINE

Edward J. Moffitt, Lakewood, Colo., assignor to Remington Arms Company, Inc., Bridgeport, Conn., a corporation of Delaware Application November 18, 1942, Serial No. 465,961

7 Claims. (Cl. 90—14)

This invention relates, in general, to machine tools, and, more particularly, to scrap removing means for a machine adapted to process tubular articles.

An object of the invention is to provide an improved housing for the tool. A further object is to provide a readily demountable tool housing. A still further object is to remove scrap material away from the working area by blowing the chips and shavings out of the discharge port of a chamber adapted to house the tool and article during the processing of the article.

Other objects, features and advantages of the invention will be set out in the following specification which is descriptive of one embodiment of the invention.

It will be understood, however, that the particular structure shown in the drawing is by way of example only and that the invention is not limited thereby but includes all modifications within the scope of the appended claims.

In the manufacture of ammunition components and, in particular, cartridge cases, the cases are formed from a suitable metallic blank of brass or harder metal by a series of cupping and drawing operations including heat treatments between successive draws. Thereafter the drawn cases are subjected to a series of operations which form a finished head on one end of the case and a tapered neck and mouth portion at the opposite end. The final step is known as "mouth trimming" and is an operation designed to trim all cases to uniform overall length and to remove any burrs at the edge of the mouth.

As now practiced, this mouth trimming and burring operation is performed by an automatic vertical spindle machine comprising a base for supporting the cases substantially vertically with their mouth portions uppermost. The cases are fed onto the base from an automatic hopper and are transferred or slid along the base to a position directly beneath the vertical spindle by means of a suitable traversing jaw which also holds the case during the trimming operation in gripping engagement with a complementary holding jaw fixed to the base. The trimming tool is carried by a vertical spindle which is mounted on the machine frame so as to reciprocate vertically with respect thereto through a predetermined stroke.

Thus, when the tool moves down into engagement with the mouth of a case, a shaving or chip is removed, the amount of scrap material thus removed being dependent upon the overall length of the case. Simultaneously a suitable projection on the lower end of the tool enters the mouth of the case and removes all burrs.

It has been found, however, that the chips which are formed during the trimming operation not infrequently drop down onto the base between the holding jaws, and, when successive cases are fed onto the base, they rest on top of these chips and shavings. The cases are thus held up off of the base so that the mouths of the cases are improperly displaced upwardly relative to the lowermost predetermined position of the tool. Consequently, when the tool moves down and engages the mouth of the case, it cuts off a proportionately large chip with the result that the cases are trimmed too short. Chips may also be delivered with trimmed shells and cause trouble in subsequent loading operation.

The present invention relates to means for effectively disposing of chips substantially as they are trimmed from shell mouths.

Figure 1:
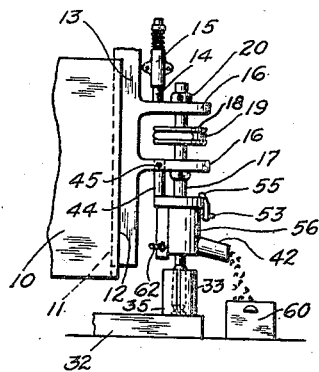
Fig. 1 is a schematic fragmentary side elevation of a cartridge case mouth trimming machine showing the improved tool housing of this invention.

Referring to the drawing, Fig. 1 shows one example of a suitable vertical spindle machine which is used extensively in trimming the mouths of cartridge cases and comprises a block 10 having a keyway 11 cut in its substantially vertical face 12 for reciprocatingly supporting a frame member 13. The latter is reciprocated with respect to the block by suitable cam means (not shown) and is provided with the usual guide post 14 adapted to reciprocate within a sleeve 15 fixed to a stationary part of the machine.

A pair of spaced parallel arms 16 project substantially horizontally from the frame member 13, each arm being provided with a vertically drilled hole both of which are in axial alignment and constitute bearings for the vertical spindle 17. The latter carries a pulley 18 suitably secured to the spindle between the arms 16 and adapted to be rotated by a belt 19 driven from a suitable power source (not shown). The spindle has a collar 20 at its upper end which is pinned to the spindle 17 and adapted to rest on top of the upper arm 16 so as to rotatably support the spindle in its vertical position. A similar collar may be secured to the spindle beneath the lower arm 16. Thus, the spindle is restrained to move vertically in accordance with the reciprocation of the frame member, its displacement being substantially equal to the length of stroke of the frame member.

Figure 2:
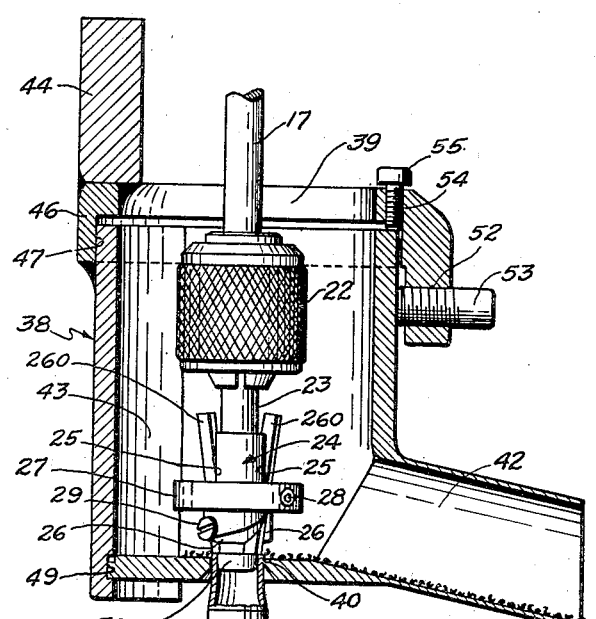
Fig. 2 is an elevation in section of the tool housing shown in Fig. 1.

At the lower end of the spindle 17 is the usual form of chuck 22, see Fig. 2, which is adapted to secure the shank portion 23 of the trimming tool indicated generally at 24 to the rotatable spindle.

The trimming tool comprises a hub portion having a pair of angularly disposed slots 25 adapted to accommodate the article processing elements or blades 26. These blades are made in the form of relatively long, thin, flat strips of hard metal, presumably designed to be repeatedly sharpened.

As shown in Fig. 2, the disposition of the slots 25 in the hub is such that the upper ends 26a of the blades extend outwardly somewhat away from the shank of the tool and also make a slight angle with respect to the vertical axis thereof. An annulus 27 embraces the hub portion of the tool 24 for holding the blades 26 in their respective slots 25, suitable set screws 28 being provided in the annulus for securing the latter to the hub.

Secured in this manner on the outside surface of the hub of the tool, the upper ends 26a of the blades will be seen to simulate vanes, and it has been discovered that, when these vanes are rotated rapidly, as for instance, at substantially 3800 R. P. M., within a substantially closed chamber, these blades or vanes have the effect of a centrifugal fan capable of producing a blast of air equivalent to a low pressure blower, as, for example, a blower having a capacity of two pounds.

Secured to the lower end of the tool by a set screw 29 is a hardened highly polished head or die 30 carefully dimensioned to make a nice fit in the mouth of a standard case. This die enters into the mouth of the case so as to center the case with respect to the trimming tool. Moreover, the die 30 supports the walls of the case adjacent the mouth during the trimming operation, and, by its withdrawal, removes any burrs formed on the inner edges of the mouth.

The cartridge cases are delivered to the tool by first depositing the cases head down onto a base 32 which has one fixed wall 33 provided with a substantially vertical semicylindrical groove 34 in alignment with the spindle 17 and adapted to constitute one-half of a vise-like holder for the cartridge cases. A complementary vise-like holder is indicated at 35 and comprises a block having a similarly shaped groove 36 adapted to accommodate a cartridge case and supported on the base 32. The block 35 is, however, adapted to be moved over the surface of the base by suitable means (not shown) so as to transfer a case held within its groove 36 from a given position on the base to a point opposite the groove 34 of the holder 33. Thereafter the complementary holder or transfer block 35 moves into engagement with the fixed holder 33, whereby the case is held in a vise-like grip by the cooperating grooves of the two holders and directly below the trimming tool.

Thus far, the description is related to one form of vertical spindle trimming machine which is being used extensively today and which is particularly adapted to the present invention.

Figure 3:
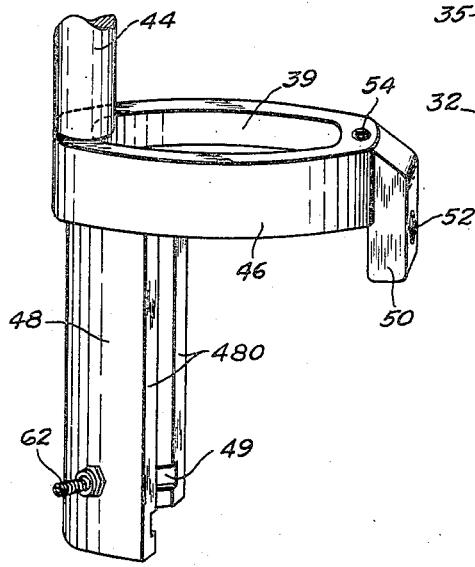
Fig. 3 is a perspective view of one element of the housing.
Figure 4:
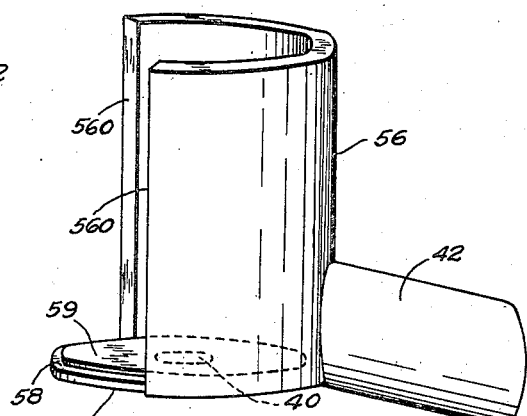
Fig. 4 is a perspective view of a second element of the housing.

The present invention is embodied in a housing for the tool of the vertical spindle trimming machine during processing of a cartridge case, and, as shown in Figs. 2, 3 and 4, comprises a cylindrical tubular member indicated generally at 38 having a relatively large opening 39 in the top thereof to receive the tool and chuck, a relatively small or restricted aperature 40 in the bottom thereof to accommodate the mouth portion of a cartridge case, and a discharge port 42 in one side adjacent the base of the housing.

As shown in Fig. 2, the tool is adapted to be located adjacent the bottom of the housing beneath the chuck 22. The latter is of such size as to partially restrict the aperture 39 in the housing so that, in effect, the tool is partially confined on all sides in what may be termed a chamber of the housing and which is indicated generally at 43.

The housing 38 is held in fixed relation with respect to the chuck and tool by a stud or post 44, one end of which is secured by a weld joint to the top of the housing at one side thereof. The opposite end of the stud is received in an aperture formed in the arm 16 of the frame and is secured therein by a set screw 45 or other suitable fastening means.

Figs. 3 and 4 of the drawing show the composite structure of the housing. The element shown in Fig. 3 comprises an apertured member 46 hereinafter termed an annulus or ring which carries the stud 44 and which has a curvilinear seat comprising a counterbore 47 formed in the bottom of said annulus. Mounted in the seat 47 immediately below the stud 44 and substantially symmetrical with respect thereto is a depending arcuate shaped apron member 48 having a pair of substantially straight edges 48a, the upper end of the apron engaging the seat 47 and being secured by a weld joint to the ring 46. A semicircular groove 49 is cut or otherwise formed on the inside of the apron member adjacent the lower end thereof. On the upper edge of the ring 46, substantially opposite the stud 44, is a depending lug 50 welded to the outside of the ring and provided with a horizontally drilled and threaded hole 52 adapted to receive a set screw 53 for the purpose hereinafter described. A vertically drilled and threaded hole 54 is formed in the top edge of the ring adjacent the lug 50 to accommodate a second set screw 55.

A demountable means adapted to be assembled in cooperative engagement with the ring member and to complement the arcuate apron portion thereof so as to form the substantially cylindrical tubular housing of Fig. 2 is shown in Fig. 4 and comprise a semicylindrical tubular body member 56 having two substantially straight edges 56a and the discharge port 42 in its wall adjacent the lower end thereof. The port 42 may comprise a short length of cylindrical pipe welded or otherwise secured in an aperture in the wall of the body 56. A suitable disk shaped base 57 is welded or otherwise secured in the bottom of the semicylindrical tubular member and is provided with the axially drilled hole or restricted aperture 40, the diameter of which is somewhat larger than the outside diameter of the mouth portion of a cartridge case so as to provide an annular opening substantially $\frac{5}{32}''$ wide between the case and the periphery of the aperture 40. The hole 40 may have a countersink in the bottom surface of the base 57 to facilitate the entrance of the mouth and neck portions of a case. A suitable groove 58 is cut in the upper edge of a lip portion 59 of the base 57; the lip portion 59 projects as shown beyond the edges 560 of the semicylindrical tubular body 56 and is adapted to be engaged in the semicircular groove 49 of the apron 48.

The two members described above and shown in Figs. 3 and 4 are assembled as follows to form the housing shown in Fig. 2. The upper edge of the member 56 is seated in the groove 47 of the ring 46 and its grooved lip portion 59 is engaged in the semicircular groove 49 of the apron member 48. The demountable member 56 is then readily secured thus in complementary relationship with the ring and apron members by the two set screws 53 and 55. By screwing the former inwardly, it engages the adjacent wall of the demountable member 56 and forces its edges 560 firmly into frictional engagement with the adjacent edges 480 of the apron 48. Then, by tightening the set screw 55, its lower end bears down against the upper edge of the demountable member 56 creating thereby a force moment which tends to pivot the member 56 downwardly and to the left as seen in Fig. 2, so as to urge the edge of the lip 59 into the lower part of the groove 49. The groove 58 in the lip provides suitable clearance for freely assembling and disassembling these engaging surfaces of the housing. It will be clear that the housing may be readily disassembled simply by loosening the two set screws and removing the demountable member 56.

The operation of the device is believed to be clear but may be briefly described as follows: With the housing secured to the reciprocating frame 13, as shown in Fig. 1, the tool will be located within the lower or chamber portion 43 of the housing 38. The machine is then started whereupon the rotating tool and housing are moved downwardly a predetermined distance such that at the moment the blades 26 of the tool engage the mouth of the cartridge case, the housing has moved down over the mouth of the case so that the latter projects through the restricted aperture 40 up into the chamber portion of the housing. Thus, during the trimming operation, the working area which may be defined as the area within which the actual trimming operation is taking place lies wholly within the chamber 43. Consequently, any scrap material such as chips or shavings removed from the mouth of the case will be confined to this chamber and prohibited from falling down onto the cartridge case carrying base 32 or into the holders 33 and 35. This latter circumstance is insured by the rapid rotation of the blades, and, in particular, the vane-like portions 260 within the chamber 43 which creates a blast of air of sufficient pressure to dispel all of the chips out of the chamber through its discharge port 42; moreover the rotating blades create a suction or upwardly moving draft of air through the annular opening between the periphery of the restricted aperture 40 and the case which is very instrumental in carrying the shavings upwardly into the chamber away from the restricted aperture 40. The chips are thus carried up and away from the working area and may be discharged out of the port 42 into a suitable scrap box 60.

Although the centrifugal fan effect of the vane portions of the tool blades has been found sufficient to draw the chips up into the housing and to blow the chips out thereof, it will be understood that the air pressure may be augmented by other auxiliary blowing means. For example, the housing is shown with a suitable nipple 62 in its wall adjacent the chamber portion thereof adapted to provide an air hose connection for a suitable low pressure blower (not shown).

What is claimed is:

1. In a machine, a frame; a tool supported by said frame; and a housing for said tool, said housing comprising a counterbored ring member having a depending substantially arcuate apron, said ring being fixed to said frame and supported independently of said tool, and a demountable semicylindrical tubular member adapted to be secured in the counterbore of said ring and to complement said fixed arcuate apron.

2. In a machine, a frame; a tool supported by said frame; and a housing for said tool, said housing comprising a ring member having a depending substantially arcuate apron secured to said frame, a demountable semicylindrical tubular member adapted to be seated in said ring and to complement said arcuate apron, and means secured in said ring adapted to hold said tubular member in frictional contact therewith.

3. In a machine, a frame; a tool supported by said frame; and a housing for said tool, said housing comprising a ring member, means carried by said ring member for securing said member to said frame, a seat in said member, an arcuate apron depending from said ring member provided with a groove, and a demountable semicylindrical tubular member having a wall portion adapted to fit in the seat of said ring and a base portion adapted to fit in the groove of said apron.

4. In a machine, a frame; a tool supported by said frame; and a housing for said tool, said housing comprising a ring member, means carried by said ring member for securing said member to said frame, a seat in said member, an arcuate apron depending from said ring member provided with a groove, a demountable semicylindrical tubular member having a wall portion adapted to fit in the seat of said ring and a base portion adapted to fit in the groove of said apron, and means carried by said ring member for urging said wall portion into said seat and said base portion into said groove.

5. In a machine, a frame; a tool supported by said frame; and a housing for said tool, said housing comprising a ring member, means carried by said ring member for securing said member to said frame, a seat in said member, an arcuate apron depending from said ring member provided with a groove, a demountable semicylindrical tubular member having a wall portion provided with a discharge port and adapted to fit in the seat of said ring and a base portion having a restricted aperture and adapted to fit in the groove of said apron, and set screws in said ring adapted to bear against the wall portion of said tubular member for securing said member in cooperative engagement with said ring member and said apron.

6. In an article processing machine, the combination with a rotating tool holder; of means for housing said tool holder, said housing means having a restricted aperture to enable a portion of said article to enter said housing and to be supported therein, and a discharge port; and article cutting tools carried by said tool holder, said tools being constructed and arranged to engage and trim the portion of the article supported in said chamber, the engaged portion of said article being unconfined by said tools and holder, said tools having radially extending vane portions opposite said discharge port adapted to create a current of air in said housing during rotation of said tool holder to blow the scrap materials out of said discharge port.

7. In a cartridge case mouth trimming machine, the combination with a rotating tool holder; of means for housing said tool holder, said housing means comprising an air chamber for enclosing said tool holder and the mouth of said cartridge case, said chamber having a restricted aperture to enable the mouth of said cartridge case to enter said chamber and to be supported therein, and a second aperture for removal of chips from said air chamber; and cartridge case trimming tools carried by said tool holder, said holder and tools being constructed and arranged to provide clearance between the mouth of the case and the holder to enable substantially unrestricted egress of chips into said air chamber, said tools having radially extending vanes opposite said second aperure adapted to create a current of air of substantially two pounds pressure in said chamber during the rotation of said tool holder to blow the chips out of said second aperture.

EDWARD J. MOFFITT.